(12) United States Patent
Daniel et al.

(10) Patent No.: US 6,988,160 B2
(45) Date of Patent: Jan. 17, 2006

(54) METHOD AND APPARATUS FOR EFFICIENT MESSAGING BETWEEN MEMORIES ACROSS A PCI BUS

(75) Inventors: Mordechai Daniel, Modi'in (IL); Assaf Zeira, Shoham (IL)

(73) Assignee: P-Cube Ltd., Hertzliya (IL)

( * ) Notice: Subject to any disclaimer, the term of this patent is extended or adjusted under 35 U.S.C. 154(b) by 183 days.

(21) Appl. No.: 09/782,090

(22) Filed: Feb. 12, 2001

(65) Prior Publication Data

US 2002/0112105 A1    Aug. 15, 2002

(51) Int. Cl.
  G06F 13/00    (2006.01)
  G06F 13/14    (2006.01)
  G06F 13/28    (2006.01)
  G06F 15/16    (2006.01)

(52) U.S. Cl. .......................... 710/310; 710/20; 710/33; 710/35; 710/52; 710/53; 710/54; 710/55; 710/56; 710/57; 710/112; 710/305; 709/200; 709/212; 709/213; 709/214; 709/216; 709/232; 709/314; 709/319

(58) Field of Classification Search ............ 710/52–57, 710/310, 20, 33, 35, 112, 305; 709/200, 709/212, 213, 214, 216–218, 232, 319, 314; 719/314, 315
See application file for complete search history.

(56) References Cited

U.S. PATENT DOCUMENTS

| | | | |
|---|---|---|---|
| 4,414,644 A | 11/1983 | Tayler | |
| 4,616,359 A | 10/1986 | Fontenot | |
| 5,042,029 A | 8/1991 | Hayakawa | |
| 5,050,162 A | 9/1991 | Golestani | |
| 5,067,127 A | 11/1991 | Ochiai | |
| 5,299,313 A * | 3/1994 | Petersen et al. | 709/234 |
| 5,488,724 A * | 1/1996 | Firoozmand | 709/212 |
| 5,548,728 A * | 8/1996 | Danknick | 709/213 |
| 5,557,744 A * | 9/1996 | Kobayakawa et al. | 709/232 |
| 5,588,132 A * | 12/1996 | Cardoza | 711/148 |
| 5,729,765 A * | 3/1998 | Cheng | 710/53 |
| 5,754,802 A * | 5/1998 | Okazawa et al. | 710/305 |
| 5,774,745 A * | 6/1998 | Ecclesine | 710/52 |
| 5,860,119 A * | 1/1999 | Dockser | 711/156 |
| 6,006,292 A * | 12/1999 | Young | 710/39 |
| 6,115,761 A * | 9/2000 | Daniel et al. | 710/57 |
| 6,131,113 A * | 10/2000 | Ellsworth et al. | 709/213 |
| 6,134,619 A | 10/2000 | Futral et al. | |
| 6,145,061 A | 11/2000 | Garcia et al. | |
| 6,170,003 B1 * | 1/2001 | Benkual et al. | 709/214 |
| 6,389,489 B1 * | 5/2002 | Stone et al. | 710/57 |
| 6,445,635 B1 * | 9/2002 | Au et al. | 365/221 |
| 6,480,942 B1 * | 11/2002 | Hirairi | 711/156 |
| 6,594,701 B1 * | 7/2003 | Forin | 709/232 |
| 6,622,183 B1 * | 9/2003 | Holm | 710/34 |

* cited by examiner

Primary Examiner—Kim Hunyh
Assistant Examiner—Tanh Q. Nguyen
(74) Attorney, Agent, or Firm—Abelman, Frayne & Schwab

(57) ABSTRACT

The method and apparatus presented are targeted to improve the performance of moving data between memory portions connected by a system bus where writes have higher performance than reads, such as the PCI bus. Due to the PCI bus design, read requests from memories connected across the PCI bus take a significantly longer time to complete than performing a write operation under the same circumstances. The present invention uses the faster write operations across the PCI bus, and queue management techniques, to take advantage of the relative speed of writes in a PCI system. The overall result is significant performance enhancement, which is especially useful in service aware networks (SAN) where operation at wired-speed is of paramount importance.

15 Claims, 4 Drawing Sheets

Before           After

METHOD AND APPARATUS FOR EFFICIENT MESSAGING BETWEEN MEMORIES ACROSS A PCI BUS

FIELD OF THE INVENTION

The present invention relates generally to systems where memory of a central processing unit (CPU) in a multi-processing system may be accessed by another CPU. More specifically, the present invention relates to a multi-processing system wherein the read operation over the shared bus is significantly slower than that of the write operation. A specific example of such a bus is that of the peripheral component interconnect (PCI) bus. Even more specifically, the invention relates to a system comprised of multiple packet processors in service aware networks (SANs), where wire-speed performance is essential to ensure a high quality of network service.

BACKGROUND OF THE INVENTION

In many multiprocessing systems, processors operate independently on various programs in order to execute the task at hand. Such systems are required when high performance is necessary, and cannot be achieved by the use of a single processing unit. Many such systems have been developed over time and multiple solutions exist for standard interface busses. The bus is used to communicate between two separate systems, over an interface, which is jointly used by two or more processing units. As a matter of illustration, FIG. 1 shows such a system. Each CPU (100) is generally comprised of a processor, and a local memory, used by that processor for its operation. In addition, it may include other input and output (IO) devices, however, such IO devices are not relevant to the present invention. Each CPU (100) is connected to a standard interface bus (110), whereby data is transferred between the CPU's of the system Interface bus (110) can be implemented as an available standard bus, or alternatively, as a proprietary bus. In the past, two common busses were used in personal computers (PC) and were also widely used in other computer systems. The two were known as the Industry Standard Architecture (ISA) and Extended ISA (EISA) busses. Other known standard busses are the Micro Channel and the Video Electronics Standard Association (VESA) busses. However, with the development of higher speed processor and peripheral devices, higher speed busses had to be developed, one of which is the Peripheral Component Interconnect (PCI) bus. In a PCI system, with the exception of certain refresh cycles, a write request has the highest priority, and therefore is handled earlier than any other request, including a read request. Therefore, a write is generally performed faster than a read. Moreover, a write operation is performed to a buffer, thereby releasing the CPU immediately to perform other operations. In contrast, a read operation does not release the CPU until the data is made available to the CPU. The time difference can become even more significant when a multiple layer PCI system is put in place. Even more important is the case where wire-speed operation is required for a SAN system, and using of read operations across the bus reduces the overall response time of the system.

Several patents disclose a variety of methods related to affecting the overall performance of PCI system, by attempting to address issue of the time imbalance between a read operation and a more time efficient write operation. Larson et al. disclose in U.S. Pat. No. 5,524,235 an arbiter circuit to control access to main memory through a PCI bus. The disclosure describes how, under certain conditions, the processor-to-memory write requests are delayed to allow other cycles to proceed. Wade et al. disclose in U.S. Pat. No. 5,613,075 a method by which a master on the bus can guarantee certain performance levels, including for read operations. This allows the system to predict the worst-case situation of providing access to read operations, and this level can be fixed according to an arbitrary threshold level.

U.S. Pat. Nos. 5,634,073 and 5,634,073 to Collins et al., describe a more complex system where a controller handles a multiple queue system between the processor and the CPU. The system is also capable of checking if a write operation already exists into the same address into which a read request is made. They also propose various ways of improving the prediction of the rules to be used to increase system efficiency.

U.S. Pat. No. 5,835,741 to Elkhoury et al., discloses a system that addresses the performance issues relating to a burst mode. The fast burst mode allows for efficient access by means of sequential accesses to sequential memory addresses.

U.S. Pat. No. 5,754,802 to Okazawa et al., suggests a method and apparatus for increasing data transfer efficiency, specifically for preventing a deadlock situation, of a read operation in a non-split transaction bus environment by substituting a write operation for the read operation. Basically this is done by substituting one of the write operations with a read operation to an IO device. The IO device then executes the write in the local environment.

A more complicated approach is described in U.S. Pat. No. 6,134,619, which however, requires specialized hardware for the indication of space availability in the queue, and a read operation on the PCI bus. This solution is tuned for the case of multiple processors using different operating systems. In U.S. Pat. No. 6,145,061 Garcia et al propose a scheme for a circular queue with head and tail pointers, and certain ways to access the queue which further allow dynamic allocation of the queue size.

Prior art does not address the need of multiple processors to access data over busses such as PCI, in a manner that (a) reduces significantly the overhead associated with the read cycles, and (b) allows a system, such as a SAN system to operate at wire speed.

SUMMARY OF THE INVENTION

It is an object of the present invention to describe an apparatus and a method for more efficiently moving data from one CPU to another over a PCI bus.

It is another object of the present invention to provide apparatus and methods for enhanced queue management.

These objects, and others not specified hereinabove, are achieved by an exemplary embodiment of the present invention, wherein a shared bus is capable of performing write operations significantly faster than read operations. The invention discloses an implementation allowing the execution of an across a computer bus read operation by its substitution with a write operation and a read to local memory. The invention is particularly well-suited for the case of the PCI bus. A method is disclosed for queue management providing enhanced performance.

In one exemplary embodiment, a computer system for transferring data between a receiving central processing unit (CPU) and a transmitting CPU by using only write operations, comprises: a receiving central processing unit (CPU); a transmitting CPU; a local memory for receiving CPU; a local memory for transmitting CPU, means for connecting between receiving CPU and second CPU where such means transfer write operations faster than read operations; and a circular queue defined between designated addresses in the local memory of the receiving CPU.

In an alternative embodiment, at least one receiving register for control of the queue is allocated in local memory of the receiving CPU and at least one transmitting register for control of the queue is allocated in the local memory of the transmitting CPU.

DETAILED DESCRIPTION OF THE INVENTION

In the exemplary embodiments described hereinbelow and with reference to the Figures, there is shown an apparatus and method which accomplishes the transmission of a data message from a transmitting CPU to a receiving CPU across a data bus, using a series of write operations and with no read operations being performed across the said data bus.

Figure 1:
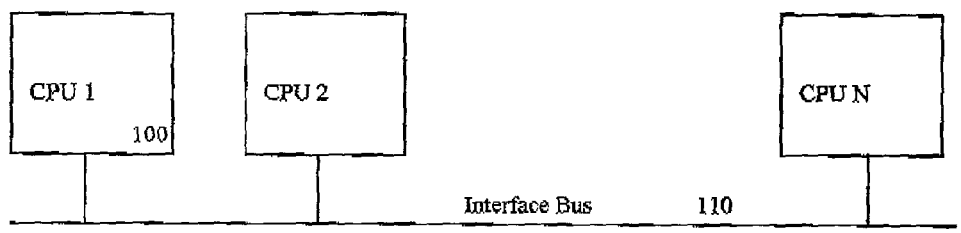
FIG. 1 is a schematic diagram of multiple CPUs connected by a common bus, in accordance with an exemplary embodiment of the present invention.

With reference to FIG. 1, an exemplary embodiment of the present invention comprises a system 10 containing at least two CPU's 100, interconnected by a PCI bus 110. Each CPU 100 has a memory portion that is accessible by at least one other of the CPUs connected to PCI bus 110. The operation of the CPU's are totally independent, and a CPU may use data provided by another CPU at a rate that is not under the control of the CPU providing the data. More specifically each CPU can write to any other CPU in the system. The present invention may also be practiced for transfers between CPUs connected by a data bus other than the PCI type used in the exemplary embodiment.

Figure 2:
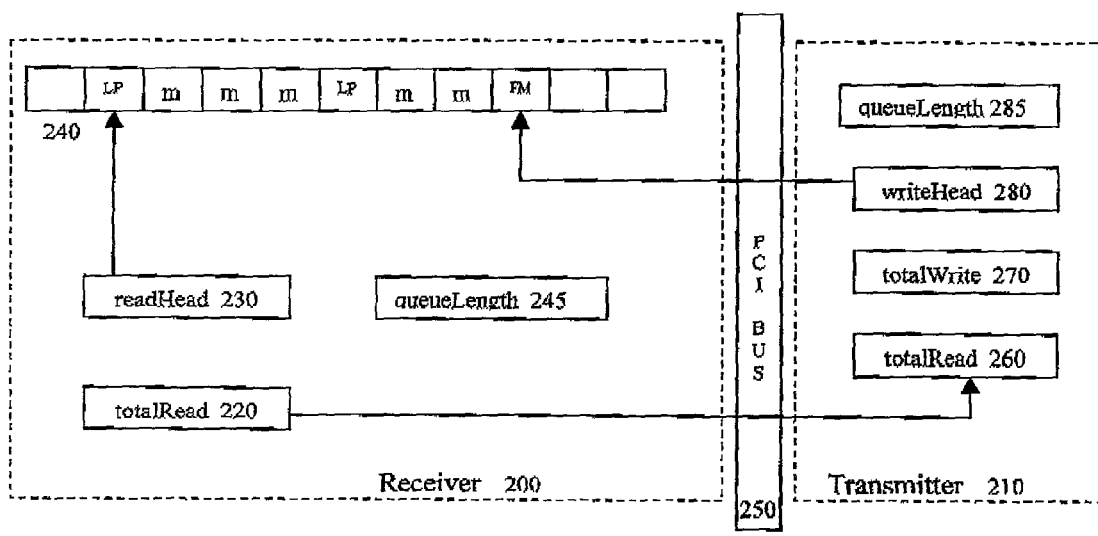
FIG. 2 is a diagram of the queue system between two CPUs, in accordance with an exemplary embodiment of the present invention.

FIG. 2 is a diagram of the queue system 20, in accordance with a preferred embodiment of the present invention, between two CPUs that are interconnected as shown and described in FIG. 1 hereinabove. While only one transmitter 210 and one receiver 200 are shown connected through a PCI bus 250, a person skilled in the art can easily expand it into a system having a plurality of transmitters and receivers. Both receiver 200 and transmitter 210 are actually components of a CPU sub-system each unit of which includes a processor, local memory, IO devices and other optional elements. Receiver 200 has a memory area that is defined as a cyclical queue 240. Generally such queues have two pointers, one that points to the memory location where reads are supposed to happen, and another pointer pointing to the next place for writing new information. As the queue has a limited available memory, once the write pointer reaches the upper limit of the queue, it resets and begins from the initial location of the queue. A similar procedure is used for the read pointer that follows the write pointer, at a different pace.

A cyclical queue is an area of memory used to store a continuous stream of data by starting again at the beginning of the queue after reaching the end. A cyclical queue may further be written by one process and read by another. Separate read and write registers are maintained. These are not allowed to pass each other otherwise either unread data would be overwritten or invalid data would be read.

It has hitherto been the case that when writing into a cyclical queue from the transmitter to the receiver, the transmitter side required the knowledge that there is space available in the queue to perform such a write. In order to perform such a function, a read request needed to be performed, thereby checking if such space is available. However, in systems where the read operation is relatively slow, such as in a PCI bus, an alternative solution is preferable and is disclosed hereinbelow in accordance with an exemplary embodiment of the present invention.

Referring again to FIG. 2, receiver 200 has a memory queue 240, a read head register 230 and a total read register 220. Read head register 230 contains the address of the next byte of data to be read in memory queue 240. Total read head register 220 contains the total number of bytes that have been read from queue 240. The receiver 200 is connected to a transmitter 210 through a PCI bus 250. Transmitter 210 comprises a total read register 260, a total write register 270 and a write head register 280. The queue length 245 and a copy of the queue length 285 are kept on both receiver 200 and transmitter 210, respectively, during system initialization.

In an exemplary implementation the processor's function is performed by a packet processor. The memory queue 240 location is assigned in the memory through allocation of a certain area, i.e., from a designated address to another designated address. The content of read head register 230 is an address pointing to the location from which data is to be read. When receiver 200 reads data received from transmitter 210, it uses the address indicated by read head register 230 to access the data necessary, and move it to a portion of the local memory for further use by the system, for example, by copying the data to a register of the processing unit. That is, data can be rewritten to another part of the memory which is not part of memory queue 240, but which is not written across PCI bus 250.

In an alternative embodiment, data may just be read from the location, if that read only needs to be done once during the data's existence at the site of receiver 200. For example, if the data is a telephone number that is needed to be called as soon as it is read, and then is no longer needed, there is no need to write the data.

As reads from memory queue 240 progress, the contents of read head register 230 and total read register 220 are updated to account for the data that was read. As writes progress, the contents of both total write register 270 and write head register 280 are updated. Performing unsigned binary calculations ensures that regardless of the actual length allocated for the memory queue 240, the pointers are correct, as long as certain conditions apply. The condition is that in an N-bit address space, the length of the queue is not larger than $2^{N-2}$. For example, in a 32-bit address space, covering 4 gigabytes of memory, the number of bytes allocated for memory queue 240 is not larger than 2 gigabytes, or $2^{31}$. For all practical purposes this is an easily accommodated limitation.

The data in memory queue 240 is written in such a way that it contains a header-type separator, denoted in FIG. 2 as length and protocol ("LP"), and actual message content, marked as "mm". The "LP" contains at least a length field, designating the amount of data to be read in the following message. Usually this is a number of bytes to be read. It further contains a predefined identification number, also known as a header "magic number", which is used by the system to verify correctness of the queue management.

The last data chunk is followed by a stopper-type separator (or stopper), which is marked as "FM," wherein F represents a hexadecimal numerical value and M represents a predefined identification number, also known as a stopper "magic number." The separator comprises at least the hexadecimal numerical value and the stopper "magic number." The predefined "magic number" in the stopper is used to verify correctness of the queue management or to check for validity. The stopper ensures that the address in read head register 230 is not incremented beyond that point. If it is reached, the system discontinues reading until such time as additional data is written to memory queue 240 by transmitter 210. When a data message is added, the "FM" field is replaced by an "LP" field.

The initialization of such a system requires that total read register 220 and total write register 270 are initialized to the same arbitrary initial value. Both write head 280 and read head 230 should be set to the address in memory that is the first byte of memory queue 240. Initially, the first bytes contain the "FM" message, indicating that no valid data is available. Both receiver queue length register 245 and transmitter queue length register 285 are initialized to contain the designated length of memory queue 240. At this point, when receiver 200 attempts to read data from memory queue 240, it reads the "FM" message, and waits for new data to be written into memory queue 240 by transmitter 210. Meanwhile, transmitter 210 finds it possible to write into the memory queue 240 because when subtracting the content of total read register 260 from the content of total write register 270 it shows the value "0". Since queue length 245 is larger than "0," transmitter 210 may write a message into memory queue 240.

Figure 3:
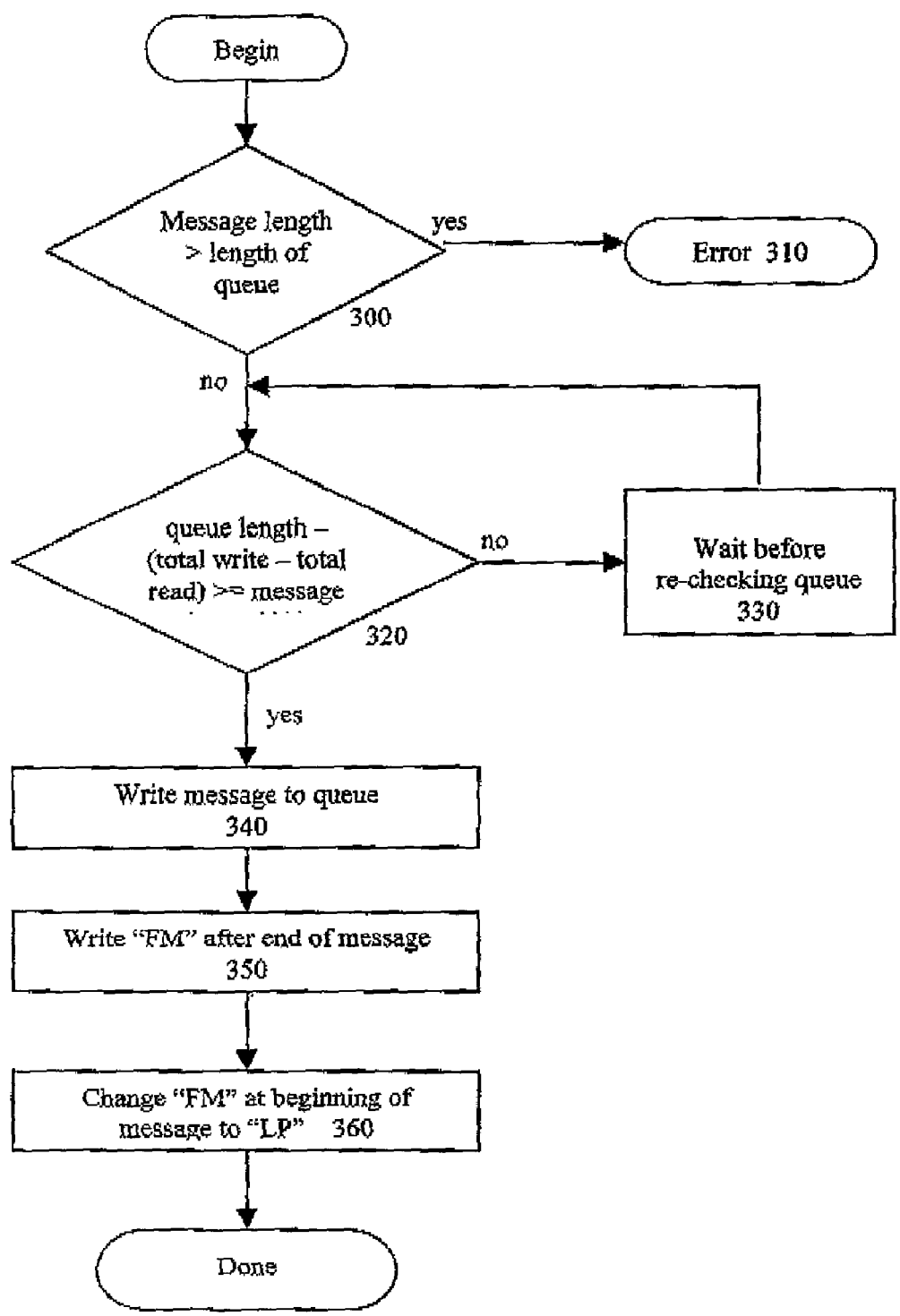
FIG. 3 is a flow chart of a write operation into a queue, in accordance with an exemplary embodiment of the present invention.

With reference to FIG. 3, there is shown a write operation flow chart in accordance with an exemplary embodiment of the present invention. The first step 300, prior to writing into memory queue 240, is to check that the length of the message is shorter than the total length allocated for the entire queue. The length of the message is provided from transmitter 210 when it receives a message to be transferred to receiver 200. If the length of the message is longer than the entire length allocated for memory queue 240, then an error message is generated in step 310. Otherwise, the amount of memory available in memory queue 240, for writing a message, is compared against the length of the message. This is done by subtracting the difference between the content of total write register 270 and the content of total read register 260 from the queue length 285 of memory queue 240, and in step 320 comparing the result with the length of the message. If there is not enough space in memory queue 240 to write the message, the transmitter 210 waits in step 330 until there is sufficient space. This happens as reads take place from the queue, and memory is freed for use. If there is enough space to write the message in memory queue 240, then the message is written in step 340 into memory queue 240 followed by the "FM" to signal the end of the last valid message 350. Only then, the old "FM" is replaced, in step 360, by writing over it an "LP" message, to signal the end of the one-before-last message, is not a last message in the queue anymore.

In order to ensure that the system operates correctly, this last operation of replacing "FM" with "LP" must happen as an atomic operation. This means that the entire operation is performed in one transaction with no interruption, i.e., no other operation on the queue occurs until this operation is completed. Specifically, in a PCI bus, an atomic operation occurs only if the data written or read is aligned on a four byte address, i.e. any address that is divisible by four, such as 8, 12, 100 etc. Also, the write operation is limited to four bytes. In a PCI bus an atomic operation is always performed on four bytes that are aligned on a four byte address. Writing 24 bytes, for example, results in three separate operations that are not atomic. In certain cases the message may not be a multiple of four bytes, and therefore may require the message to be padded by one, two or three bytes in order to get it to be of a length that is a multiplier of four bytes. In addition both "LP" and "FM" should be four bytes in length. The result is that at all times the message, the "LP" and the "FM" are each aligned on a four byte address. The "LP" contains the original length of the message, prior to the padding.

A well-known method of splitting a message between the tail and head of a cyclical queues would require that there is sufficient space for writing the data into the queue, however, the actual writing is performed by splitting the writes to the tail of the queue, then the head of the queue, and after that back to the tail of the queue to update the old "FM" to an "LP". While possible, this approach reduces the overall performance of the system and another approach, utilized by the present invention, is illustrated in the flow chart of FIG. 4.

Figure 4:
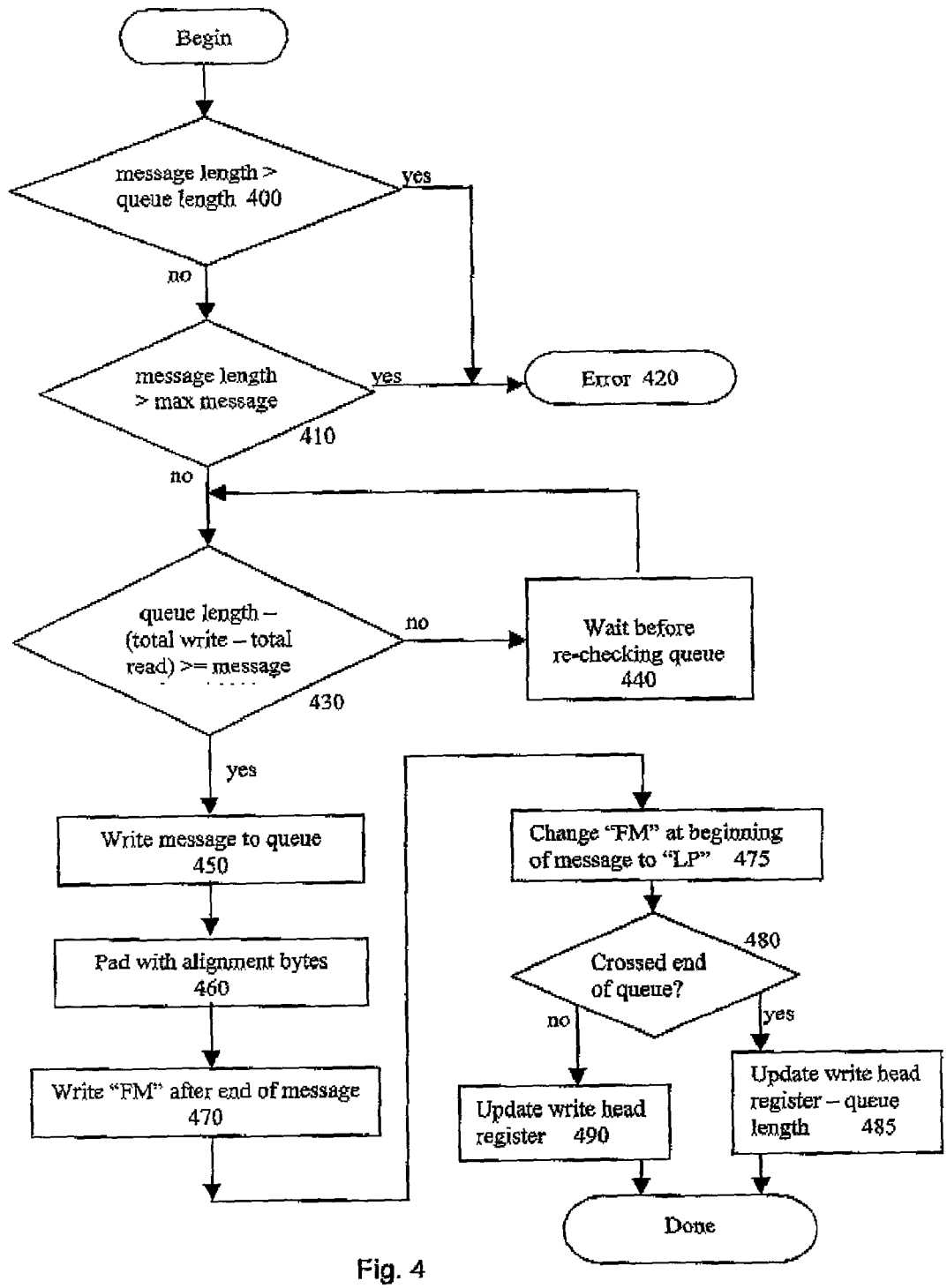
FIG. 4 is a flow chart of the write operation into a queue with a tail, in accordance with an exemplary embodiment of the present invention.

With reference to FIG. 4, there is shown a flow chart illustrating a process of a write operation into a queue with a tail, in accordance with an exemplary embodiment of the present invention. For this purpose the concept of the maximum message is introduced. This is a limitation imposed on the length of the message that may be written into the queue in one write operation. When the queue is allocated in memory, an additional space, or a tail, which is the length of the maximum message, is added to the queue length. The write process begins by checking 400 if the message length is larger than queue length 285, or if the message is larger than the maximum length allowed 410, an error message is generated 420. If the message size is within the allowable length, then the available space in queue 240 is checked, based on data in the transmitter 210 and contained in its respective registers 430. If there is not enough space, then transmitter 210 waits until such time as enough space is made available 440. Once sufficient space is available, the message is written 450 into memory queue 240 and, if necessary, alignment bytes are added 460 to ensure that the message is aligned with the specific alignment restrictions of system 10. In the case of a system 10 that incorporates a PCI bus 250, such an alignment is a four byte, or 32 bit, alignment, hence one, two or three padding bytes will be added in order to achieve such alignment.

The "FM" message is now written 470 at the end of the message, and is then the "FM" at the beginning of the message is replaced 475 by an "LP" message which must occur as an atomic operation as explained above. In step 480 it is determined whether the write operation has crossed the boundary of the queue length. If the queue boundary was crossed, i.e., the end of the message was written into the tail of the queue, an address, which is determined from the initial write head address, is added 485 to the queue length, then the write head register address must be updated as follows:

> new write head=old write head+padded message length+2*stopper length−queue length.

Thus, there are two stopper lengths, in order to account for a stopper at the beginning and a stopper at the end.

Figure 5:
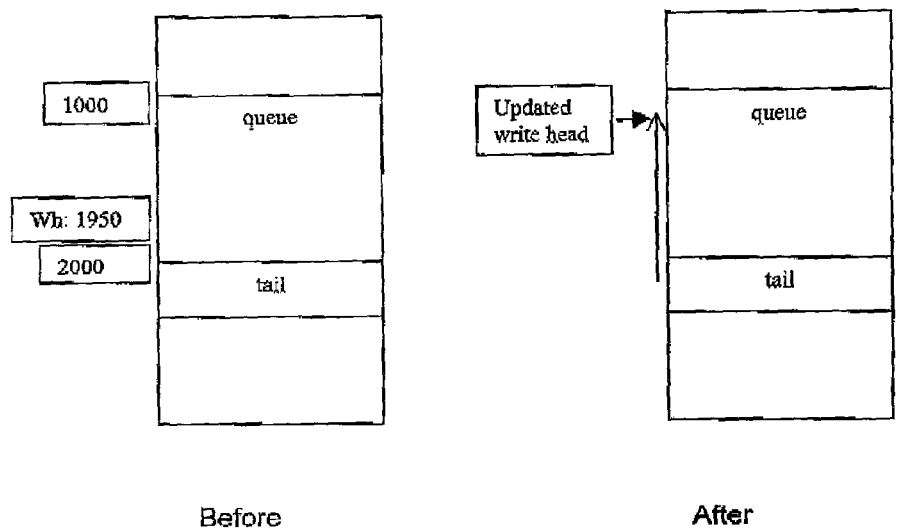
FIG. 5 is a queue diagram, before and after a write operation, illustrating use of the queue tail, in accordance with an exemplary embodiment of the present invention.

This operation, in fact, brings the write head pointer to the same place that it would have been, had the split write operation been used, as described above. The advantage is clear, as calculation complexity is reduced and performance increased, a performance advantage that is achieved at the expense of additional memory. With reference to FIG. 5, there is shown a schematic illustration of that operation.

FIG. 5 is a queue diagram, before and after a write operation, illustrating use of the queue tail, in accordance with an exemplary embodiment of the present invention. This example assumes that the write head is at address 1950, and the queue length is 1000, beginning at address 1000. If the maximum message allowed for the example is 100, then the address of the end of the tail of the queue is 2100. When a message of length 80 is written to the queue, it is written from address 1950 through address 2030. After the write operation, the write head is updated to address 1030, instead of the address 2030, as the 2030 address is within the tail area.

If the queue boundary is not crossed, then the write head register is updated as follows:

> new write head=old write head+padded message length+2*stopper length.

Figure 6:
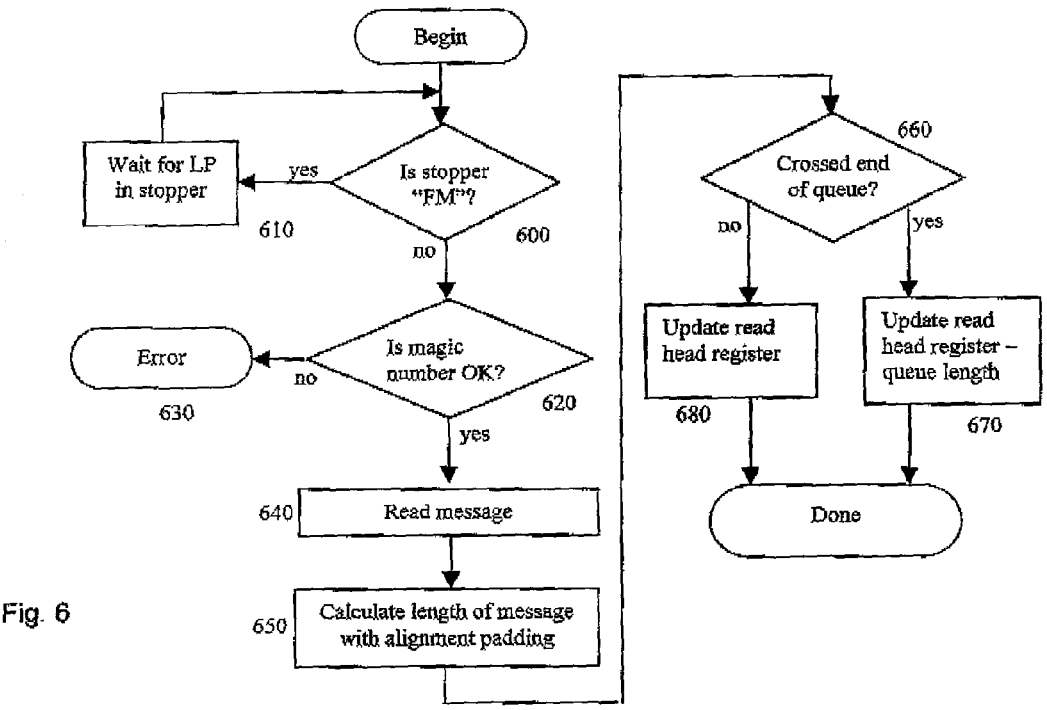
FIG. 6 is a flow chart of the read operation from a queue with a tail, in accordance with an exemplary embodiment of the present invention.

FIG. 6 is a flow chart of the read operation by the transmitter 210, from a queue with a tail, in accordance with an exemplary embodiment of the present invention. When a read operation is requested by the local CPU of the receiver, the queue is checked 600. If the stopper indicates that it contains the "FM" designator, then the receiver 200 waits 610 until such time as the "FM" designator changes to "LP," indicating that the content of the queue, that follows, contains a message.

Once it is determined that the queue contains a message, the "magic" number is checked 630 for validity. The "LP" contains the length of the message, excluding the length of the padding bytes. This information is used to actually read 640 the data from the memory queue 240. Next, the length of the message, including the padding bytes, is calculated 650, followed by a check 660 for crossing the boundary of the queue into the tail. If the boundary of the queue was crossed, then the new read head is calculated 670 as follows:

> new read head=old read head+padded message length+2*stopper length−queue length.

However, if the boundary of the queue is not crossed, the new value for the read head is calculated 680 instead as follows:

> new read head=old read head+padded message length+2*stopper length.

Essentially this method of calculating the new address is identical to that used by the write operation, however, the only exchange between the receiver 200 and the transmitter 210, after initialization takes place, is the update by the receiver to the transmitter of the number of data bytes read that is only done through the use of write operations resulting in an overall performance advantage for the system.

The process described above is advantageous over prior art, as all the exchanges between the transmitter and the receiver are done through write operations. As on certain busses, such as PCI, the write operation is considerably faster that that of a read operation, the ability to use only write operations to transfer data from one unit to the other, provides for overall higher system performance. This is specifically important in service aware networks (SAN), where multiple packet processor may be operating over a PCI bus, and operation at wire-speed, is essential for the overall network performance. Wire speed is the speed at which packets can flow through the network wires, without undue pause, for example, for network management administrative reasons.

It should be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description, and which are not disclosed in the prior art.

What is claimed is:

1. A computer system for transferring data between a receiving central processing unit (CPU) and a transmitting CPU by using only write operations therebetween for the purpose of avoiding a direct read operation by the transmitting CPU from the receiving CPU, said system comprising:

a) at least one receiving central processing unit (CPU) comprising at least a read head register, a first queue length register, and a first total read register;
   b) at least one transmitting CPU comprising at least a write head register, a second total read register, a total write register, and a second queue length register;
   c) a local memory for said receiving CPU;
   d) a local memory for said transmitting CPU;
   e) means for connecting between said receiving CPU and said transmitting CPU where such means transfers write operations faster than read operations; and
   f) a circular queue defined between designated addresses in said local memory of said receiving CPU, wherein said read head register contains a pointer to the location of the next read from said circular queue and said write head register contains a pointer to the location of the next write into said circular queue, and wherein said receiving CPU is coupled to periodically update said second total read register in the transmitting CPU with a content of said first total read register using one or more write operations, and wherein said transmitting CPU is coupled to write data comprising one or more message separators and one or more messages into said circular queue, responsively to said write head register said second total read register, said total write register and said second queue length register.

2. The system of claim 1 wherein said means for connecting between said receiving CPU and said transmitting CPU is a PCI bus.

3. The system of claim 1 wherein said read head register and said write head register are set to point to the same address upon initialization.

4. The system of claim 1 wherein a maximum length is imposed on a message to be written into said circular queue.

5. The system of claim 4 wherein a tail is added at the end of said circular queue, said tail being equal in length to said maximum length imposed on said message.

6. The system of claim 1 wherein a header separator is used to indicate the end of said message.

7. The system of claim 6 wherein said header separator contains the length of the immediately following message.

8. The system of claim 6 wherein said header separator contains a predefined header "magic" number.

9. The system of claim 8 wherein, if said header separator contains an erroneous header "magic" number, an error message is generated.

10. The system of claim 6 wherein a separator of the last message in said queue is a stopper separator, and is different from a header separator placed between subsequent messages.

11. The system of claim 10 wherein said stopper separator further contains a predefined stopper "magic" number.

12. The system of claim 11 wherein, if a stopper separator contains an erroneous stopper "magic" number, an error message is generated.

13. The system of claim 1, wherein writing a data message into said circular queue comprises the steps of:
   a) checking that the length of said data message is not greater than the length of said queue, and generating an error message if said data message length is greater than said circular queue length;
   b) checking that length of said data message is not greater than a maximum message length, and generating an error message if said message length is greater than said maximum message length;
   c) repeatedly checking if there is sufficient memory available in said queue to contain said message until such time that sufficient memory is available;
   d) writing said data message into said queue;
   e) writing a stopper designator immediately after the end of said message;
   f) replacing the stopper designator at the end of the immediately preceding message with a message separator; and
   g) updating the content of a total writes register by adding the number of bytes written into said circular queue.

14. The system of claim 5, wherein reading a data message from a transmitting CPU into said queue having said tail, comprises the steps of:
   a) checking that said data message to be read is in said queue or otherwise wait for said message to enter said queue;
   b) checking that a "magic" number is valid, or otherwise generate an error message; and
   c) reading said message without alignment padding bytes.

15. The system of claim 1, wherein said transmitting CPU is coupled to calculate a difference between said total write register and said second total read register, to subtract the difference from said second queue length register to produce a calculated available space, and to compare said calculated available space to the length of the one or more messages, so as to verify that sufficient memory space is available in the circular queue for writing said one or more messages.

* * * * *